United States Patent [19]

Sieber et al.

[11] Patent Number: 4,782,349

[45] Date of Patent: Nov. 1, 1988

[54] METHOD AND APPARATUS FOR CALLIGRAPHIC WRITING

[76] Inventors: Jonathan D. Sieber; Joseph S. Sieber, both of 31 Granville Rd., Cambridge, Mass. 02138

[21] Appl. No.: 934,950

[22] Filed: Nov. 26, 1986

[51] Int. Cl.⁴ ............................................ G01D 15/16
[52] U.S. Cl. ................... 346/139 R; 346/1.1; 364/520
[58] Field of Search ............ 346/1.1, 29, 139 R; 364/520

[56] References Cited

U.S. PATENT DOCUMENTS

| | | |
|---|---|---|
| 4,135,245 | 1/1979 | Kemplin et al. ............ 346/139 R X |
| 4,364,056 | 12/1982 | Suzuki et al. ........................ 346/29 |
| 4,435,772 | 3/1984 | Suzuki et al. ....................... 364/520 |

Primary Examiner—A. D. Pellinen
Assistant Examiner—Derek S. Jennings

[57] ABSTRACT

A calligraphic writing system which is operative under selected writing conditions for maintaining flow of writing fluid (e.g., ink) in the calligraphic pen.

29 Claims, 2 Drawing Sheets

METHOD AND APPARATUS FOR CALLIGRAPHIC WRITING

This invention relates to a system for performing calligraphic writing and more particularly to a method and apparatus for utilizing a conventional plotter to do such writing.

BACKGROUND

While plotters have been used heretofore to write a variety of images, such plotters have been adapted for use only with ball point or felt tip pens, pens which are not suitable for performing calligraphic writing. Notwithstanding the clear advantages in having calligraphic writing done automatically, particularly in tedious applications such as addressing invitation envelopes, there are a number of problems which have prevented calligraphic pens, such as calligraphic fountain pens or spring-loaded plastic-tip marker pens, from being used in conventional plotters. One of the most serious of these problems is maintaining flow of ink or other writing fluid in the pen, particularly during short intervals when the pen is not writing, and assuring that ink is flowing properly before a large number of envelopes or other documents are ruined.

There are a number of ways in which ink flow may be interrupted in a calligraphic pen. First, most inks used in the pens, particularly the colored inks, consist of pigment particles suspended in a liquid solution. If the pen, and the ink therein, is not continuously, or at least periodically, agitated, the pigment particles will migrate under the force of gravity to the bottom of the pen's ink reservoir and will solidify, blocking ink flow. With spring-loaded plastic-tip marker pens, ink flows when the point is pressed against the paper or other writing surface as on a downstroke of the pen. If ink is not maintained flowing, the ink can dry out resulting in poor quality writing. This can occur when the pen is idle or during long periods of continuous writing. Similarly, when a fountain pen is not in use, residual ink in the channel or grove of the pen nib can dry up and solidify, blocking the channel and preventing ink flow the next time an attempt is made to use the pen.

SUMMARY OF THE INVENTION

For the reasons indicated above, the problem of maintaining ink flow in calligraphic pens, particularly when the pen is idle, has been a serious deterrent to using plotters for doing calligraphic writing.

This invention therefore provides a calligraphic writing system which includes a means operative under selected writing conditions for maintaining flow of writing fluid (e.g., ink) in the calligraphic pen. More particularly, this invention relates to a method for using a conventional plotter to perform calligraphic writing which includes the steps of mounting a calligraphic pen having a tip as a writing pen in the plotter; providing first and second instructions from a computer controlling the plotter; operating the plotter in response to the first instructions to cause a predetermined image to be written thereon; and operating the plotter under selected writing conditions and in response to the second instructions to maintain ink flow in the pen. A timer, which may be included as part of the computer or may be a separate component, is reset in response to a predetermined writing condition, such as a downstroke of the pen, and a predetermined sequence of steps to maintain ink flow is performed in response to the timer timing out. The sequence of steps includes moving the pen to an address position where it is not over the document being written, causing a downstroke of the pen, and causing the pen to write a predetermined image. The image may, for example, be a straight line approximately one inch in length.

DETAILED DESCRIPTION

Figure 1:
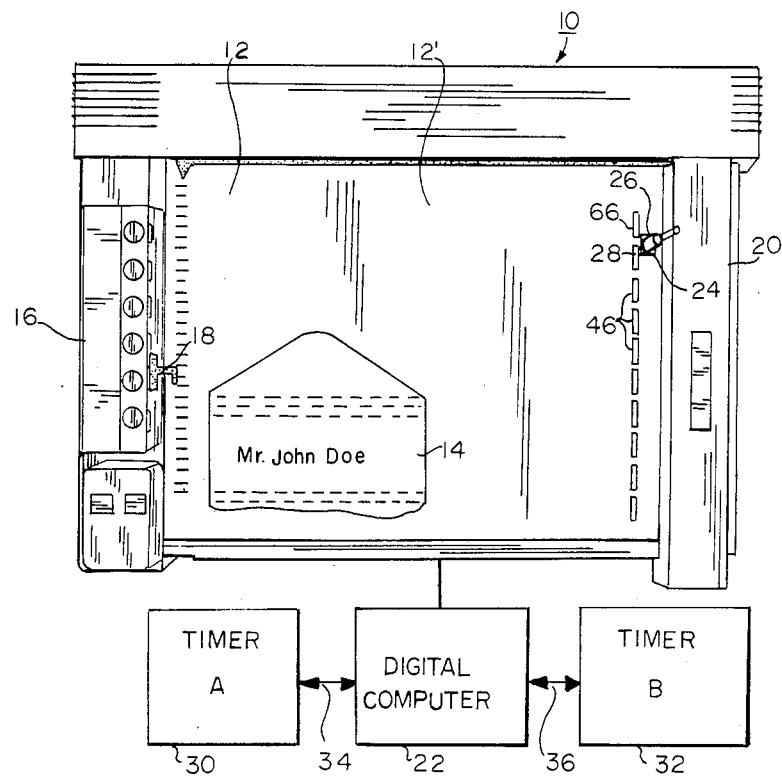
FIG. 1 is a semi-schematic top plan view of a plotter in use to practice the teachings of this invention.

Referring to FIG. 1, an x-y plotter 10 suitable for practicing the teachings of this invention is shown. The plotter has a recording table 12 on which a sheet of paper, envelope, or other medium on which images are to be plotted is positioned. In FIG. 1, an envelope 14 is shown positioned on the table. The medium may be held on table 12 by clamps, magnets, or other suitable means (not shown) which do not form part of the present invention. A pen stocker 16 having at least one pen holder 18 is positioned to the left of table 12, a pen being positioned in holder 18 when not in use. A slider 20 is provided which may be moved and positioned in a horizontal direction, as viewed in FIG. 1, under control of digital computer 22 (e.g., Epson Model Equity II). A carriage 24 is mounted in slider 22, a calligraphic pen 26 being mounted in a pen holder 28 attached to carriage 24. A plotter, carriage and pen holder suitable for use in the present invention are disclosed in our pending application Ser. No. 882,239 filed July 7, 1986, which is hereby incorporated by reference.

Carriage 24 may be moved and positioned in a vertical direction, as viewed in FIG. 1, under control of computer 22. Thus, by the combined movement of slider 20 and carriage 24, pen 26 may be positioned at any point on table 12 and may be moved in any direction along the table. Carriage 24 may also be moved down in response to a downstroke instruction from computer 22 to bring pen 26 into contact with a document positioned on table 12 for writing a image thereon or may be raised in response to an upstroke instruction from computer 22 to permit pen 26 to be moved without writing an image. In connection with practicing the teachings of this invention, a cover sheet 12' is provided on recording table 12 between the table and the document 14 to be written on.

Also for use in practicing the teachings of this invention, a first timer 30 (timer A) and a second timer 32 (timer B) are shown in FIG. 1. The duration of these timers may be manually set by inputting the desired information to computer 22 or may be automatically set, by for example a lookup table in the computer, in response to information from the user such as the color or type of ink being used in pen 26 and the type of pen being utilized. The criteria in setting the timers will be discussed in greater detail in connection with the operation of the system. Timers 30 and 32 are reset in response to commands from computer 22 over lines 34 and 36 respectively in a manner to be described in greater detail in connection with the operation of the system and provide information over the same lines to computer 22 when they time out. While for purposes of illustration, a separate digital computer 22 has been shown in FIG. 1, the computer may in fact form part of a unitary computer controlled plotter. Similarly, while separate timers 30 and 32 have been shown in the figure, these timers would normally be included as part of computer 22.

OPERATION

Figure 2:
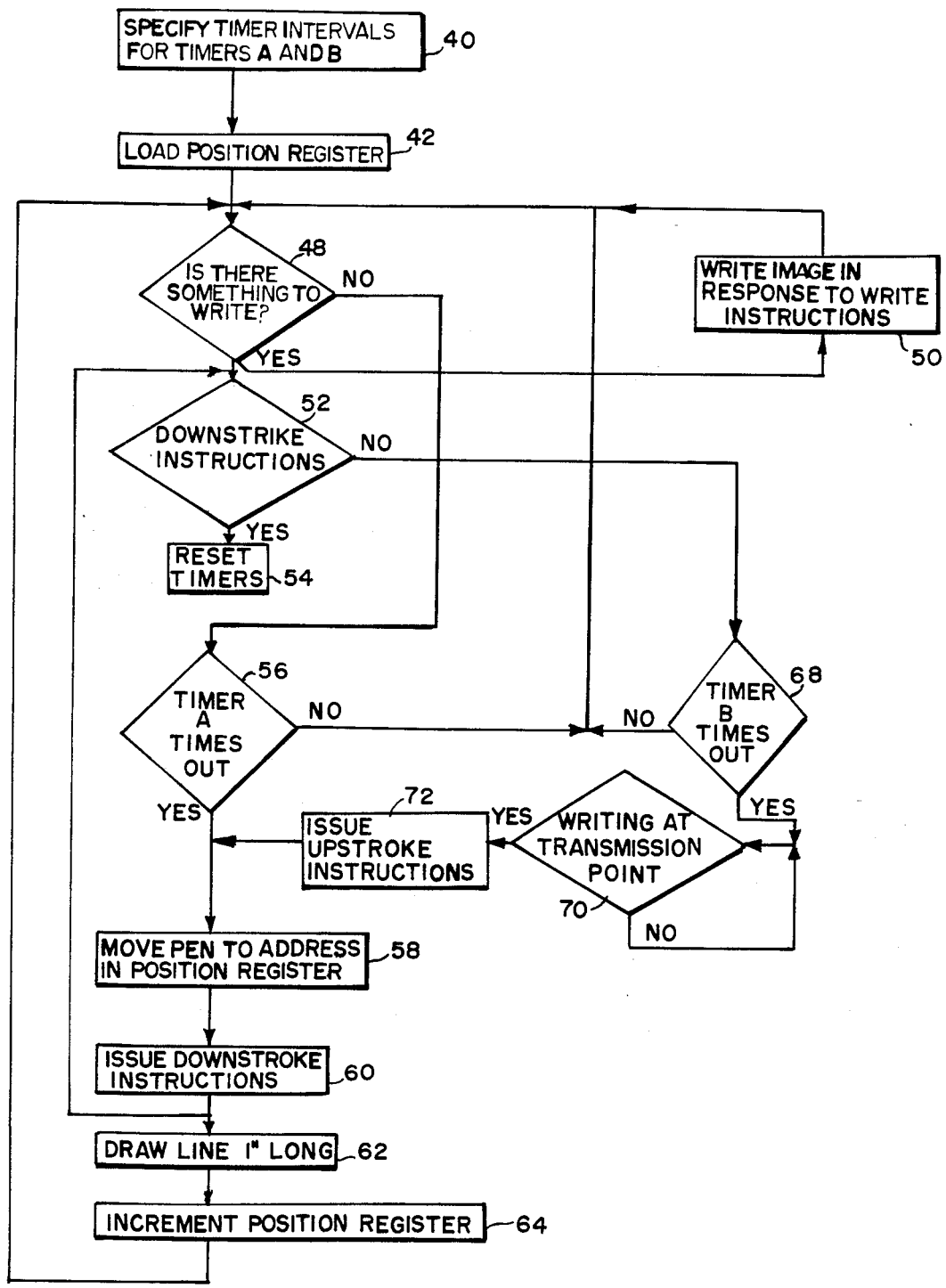
FIG. 2 is a flow diagram of the method of doing calligraphic writing, and in particular of the method of maintaining ink flow, of this invention.

FIG. 2 is a flow diagram of the method and apparatus of this invention. Referring to this figure, it is seen that, when plotter 10 is turned on, or when a new job is begun, either one or both of two preliminary steps, steps 40 and 42, are performed. During step 40, the timer intervals are specified for timer A and timer B. As will be discussed in more detail later, timer A is operative to initiate an ink-flow-maintenance sequence of operations when the pen is idle and a predetermined period of time has passed since the last downstroke, while timer B is operative to cause an ink-flow-maintenance sequence of operations to be performed when the pen has been continuously writing (i.e. writing without an intervening downstroke) for a second predetermined period of time, the second predetermined period of time being substantially greater than the first predetermined period of time. The time interval of timer B will therefore be substantially greater than the time interval of timer A, both time intervals varying depending on a number of factors including the type of ink being utilized for a given job and the type of calligraphic pen being utilized. For example, if a heavily pigmented ink is used, more frequent ink flow maintenance cycles will be required to keep the ink agitated and prevent the ink from solidifying than if inks with lesser pigmentation are utilized. Suitable durations for timer A have been found to be in the range of five to twenty seconds while suitable intervals for timer B would typically be in the range of one to five minutes. Step 40 may be performed by either keying the desired interval into computer 22 or by keying information such as the ink type or color and pen type into the computer and having the computer determine the proper time intervals for the timers through use of lookup tables or other suitable means.

During step 42 an address is loaded into a position register (not shown) in computer 22. This address is the address position on table 12 of point 44 where the writing of ink-flow-maintenance lines 46 begins. The manner in which lines 46 are drawn and their function will be described in greater detail later. The address of point 44 may be loaded in response to a address input from the operator or may be a pre-stored address which is loaded into the position register in response to a reset or start command.

Once the preliminary steps have been completed, the system goes into an operational mode. The first step in the operation, step 48, is to determine if computer 22 has anything for the system to write. If computer 22 determines that it has something for the system to write, it proceeds to step 50 to cause the desired image to be written on document 14. The image may, for example, be a particular name and address to be written on an envelope. This write operation, which may generally be of a conventional type, involves the steps of moving the pen to a desired position to initiate writing, issuing a downstroke instruction, causing the pen to move through a predetermined path to write a desired image such as a character or a word, issuing an upstroke instruction, repositioning the pen to the start position of the next image and repeating this sequence of operations until all of the desired images have been written. For example, in FIG. 1, the first three words of an address, in this case the name of the recipient, are shown written on the envelope. The pen can be positioned and operated to write the remainder of the address in the manner indicated above. At the end of the writing of each image, the operation returns to step 48 to determine if there is something more to be written. This sequence of operations continues until all desired images have been written.

In addition to branching to step 50, a "yes" output from step 48 causes step 52 to be performed. During this step, a determination is made as to whether a downstroke instruction has been issued. If a downstroke instruction has been issued, as for example would occur at the beginning of an image, the operation proceeds to step 54 to reset timers 30 and 32.

If during step 48 a determination is made that there is not something to write, meaning that the pen is idle, the operation proceeds to step 56 to determine if timer A has timed out. If timer A has not timed out, the operation returns to step 48 to determine if there is something to write. Steps 48 and 56 are repeated until, during one of these steps, a "yes" output is obtained. If a "yes" output is obtained during step 56, indicating that timer A has timed out, before a "yes" output is obtained during step 48, this means that the predetermined period of time (generally five to twenty seconds) has passed since the last downstroke and the pen is idle so that the ink-flow-maintaining sequence of steps is required to maintain the ink pigment in solution and for the other reasons previously discussed.

Thus, when a "yes" output is obtained during step 56, the process proceeds to step 58 during which the pen, which at the time is in its up or non-writing position, is moved to the address shown in the position register. For the first ink-flow-maintaining cycle, this is the address of point 44 (FIG. 1). When the pen has been properly positioned, the process proceeds to step 60 to issue one or more downstroke instructions. Each downstroke of the pen agitates the ink in the pen helping to maintain it in solution and also causes ink flow in a spring-loaded plastic-tip marker pen.

From step 60, the process proceeds to perform two functions. First, the process performs steps 52 and 54 to cause the timers to be reset. Second, the process proceeds to step 62 to cause a line 46 of approximately one inch length to be drawn starting at the point indicated in the address register. The line 46 is drawn on cover sheet 12'. While the exact length of line 46 is not critical, the line has to be long enough to assure that ink is flowing smoothly and should not be longer than is required so a to minimize the plotter and computer time and the amount of ink used for performing the ink-flow-maintenance function. It has been found that approximately one inch is the minimum line length which is required to perform the function with all types of ink. While it may be possible to use shorter lines with some types of ink, or some types of pens, the amount of time and ink saved does not warrant the added complexity of making the line length programmable. Further, while straight up and down lines 46 have been shown in FIG. 1, horizontal, angled or curved lines could also be drawn. However, for the plotter shown in FIG. 1, straight vertical lines create the least wear and are thus preferable. For other types of plotters, straight horizontal or other types of lines might be preferable. The actual line or image drawn during step 62 is chosen based on the particular type of pen. With a calligraphic pen, the line is drawn in a direction which puts pressure on the nib so as to cause the nib to spread slightly; with a felt-tip pen, the force in all directions should be the same. In any event, the writing operation is of sufficient duration to maintain ink flow in the pen.

From step 62 the operation proceeds to step 64 to increment the address in the position register to the address at which the next line 46 to be written should begin. In FIG. 2 the second line would, for example, begin at point 66.

From step 64, the process returns to step 48 to determine if there is something to write. Assuming the pen is still idle, the process will proceed through steps 48 and 56 until timer A again times out and will then perform steps 58 through 64 to cause another line 46, for example the line starting at point 66, to be written. This sequence of operations will be repeated, with, after ten cycles for the embodiment shown in FIG. 1, the horizontal address in the position requested being incremented by one and the vertical address being reset to its original value. Ink flow in the pen is thus maintained until there is again something to write, resulting in a downstroke instruction which resets the timers.

While the pen is writing images, steps 48 and 52 are producing "yes" and "no" outputs respectively causing the operation to proceed to step 68. During this step, a determination is made as to whether timer B has timed out. This step may be required, particularly with spring-loaded plastic-tip marker pens, if the pen is drawing a single image, without an intervening downstroke, for an extended period of time ranging from one to five minutes depending on the ink and pen being utilized. The need for this step can be eliminated by carefully programming the write operation to provide an upstroke and downstroke at natural break points in the image when long images are being written, assuring the required agitation of the ink and the repriming of the ink flow in spring-loaded pens. However, timer B provides added assurance against an interruption in ink flow when long images are being written. If during step 68, a determination is made that timer B has not timed out, the operation proceeds back to step 48.

If a sufficiently long image is being written so that, during step 68, timer B has been found to time out, the operation proceeds to step 70. During this step, a determination is made as to whether the writing operation is at a transition point. A transition point would for example be a point where there is a change in line direction. The reason for this is that the ink flow maintenance sequence of steps may result in the pen being moved to the address shown in the address register and then being returned to the point at which the writing was interrupted and the ink flow maintenance procedure may result in a slight variation in the ink flow and thus in the appearance of the writing so that, if the operation is performed in for example the middle of a line, a noticeable discontinuity may appear in the image being drawn. Any such discontinuity will be less apparent at a transition point. If during step 70 a determination is made that the writing is not at a transition point, step 70 is repeated until a transition point is found.

When a transition point is found during step 70, the operation proceeds to step 72 to issue an upstroke instruction. While in FIG. 2 the operation proceeds from step 72 to step 58 to move the pen to the address shown in the address register and to steps 60 and 62 to cause a line 46 to be drawn, acceptable results can also be achieved by having step 72 followed by a step which causes a downstroke instruction to be issued and having the process then return to step 48. An advantage of this latter procedure is that it reduces the time required for the ink flow maintenance operation and the amount of ink used for this function.

The drawing of the lines 46 also provides a visual indication to the operator that ink is flowing properly in the pen when the system is idling and permits the operator to stop the operation and correct an ink flow problem without ruining a document 14 to be written on.

The above has described a relatively simple method and apparatus for maintaining ink flow in a calligraphic pen when used to do calligraphic writing in a computer-controlled or other type of plotter and has also described certain variations or alternatives in the method and apparatus. Those and other variations in form and detail may be made in the preferred embodiment without departing from the spirit and scope of the invention.

What is claimed is:

1. In a writing system comprising:
   an ink pen;
   a table adapted to have a document mounted thereon;
   means for mounting said pen slightly above said table; and
   means for causing said pen to write a desired image on said document,
   that improvement wherein said system includes means operative under selected writing conditions for maintaining flow of writing fluid in said pen, said means including a timer and being responsive to the timing out of said timer for causing selected movement of said pen to maintain said flow of writing fluid.

2. A system as claimed in claim 1 wherein said means for maintaining flow is responsive to a predetermined writing condition to reset said timer, and performs a selected series of steps to maintain said fluid flow.

3. A system as claimed in system 2 wherein said means for maintaining ink flow moves said pen to a predetermined addres position on said table, causes a downstroke of said pen, and causes said pen to write a predetermined image.

4. A system as claimed in claim 3 wherein said predetermined image is a line approximately one inch in length.

5. A system as claimed in claim 2 wherein the predetermined writing condition which causes the timer to reset is a downstroke of said pen.

6. A system as claimed in claim 2 wherein said means is operative only if said pen is not writing.

7. A system as claimed in claim 6 wherein the duration of said timer is five to twenty seconds.

8. A system as claimed in claim 6 including a second timer, the duration of said second timer being greater than the duration of the timer; and wherein said means is operative for said second timer, only when said pen is writing.

9. A system as claimed in claim 8 wherein the duration of said second timer is 1 to 10 minutes.

10. A system as claimed in claim 8 wherein, when operative in response to the timing out of said second timer, said means issues an upstroke instruction, moves said pen to a predetermined address position, and causes said pen to write a predetermined image.

11. A system as claimed in claim 1 including a digital computer; and wherein said means for causing an image to be written is responsive to first instructions from the computer and said means for maintaining writing fluid flow is responsive to second instructions from the computer.

12. A method for using a computer-controlled plotter to do calligraphic writing comprising the steps of:
mounting a calligraphic pen as the writing pen in said plotter;
providing first and second instructions from said computer to said plotter;
operating said plotter in response to said first instructions to cause a predetermined image to be written on the document;
setting a timer to a predetermined interval; and,
operating said plotter under selected writing conditions and in response to said second instructions to maintain flow of writing fluid in said pen,
said maintain fluid step including the steps of resetting said timer in response to a predetermined writing condition, and performing a selected sequence of steps to maintain fluid flow in response to said timer timing out.

13. A method as claimed in claim 12 wherein said sequence of steps to maintain fluid flow includes moving the pen to a selected address position, issuing a downstroke instruction, and writing a predetermined image.

14. A method as claimed in claim 13 the predetermined image being written is a straight line approximately one inch in length.

15. A method as claimed in claim 12 wherein said predetermined condition is a downstroke of the pen.

16. A method as claimed in claim 12 wherein said sequence of steps to maintain fluid flow is performed when said timer times out only if the pen is not writing at such time.

17. A method as claimed in claim 16 wherein the duration of said timer is 5 to 20 seconds.

18. A method as claimed in claim 16 including a second timer having a duration greater than that of the timer; and wherein the selected sequence of steps to maintain fluid flow is performed if said pen is writing when said second timer times out.

19. A method as claimed in claim 18 wherein the duration of said second timer is 1 to 10 minutes.

20. A method as claimed in claim 18 wherein the selected sequence of steps to maintain fluid flow when the second timer times out includes the steps of determining that a predetermined point has been reached in the writing cycle, issuing an upstroke instruction, moving the pen to a predetermined address position, issuing a downstroke instruction, and writing a predetermined image.

21. In a plotter having a calligraphic pen mounted therein for doing calligraphic writing on a selected document, that improvement comprising means for maintaining a fluid flow in the pen, said means detecting a predetermined movement of the pen, being responsive to said movement for resetting a timer, and being responsive to said timer timing out for operating said pen in a predetermined manner to cause ink flow in said pen to be maintained.

22. A means as claimed in claim 21 wherein said means moves said pen to a predetermined address position, causes a downstroke of said pen, and causes said pen to write a predetermined image.

23. A means as claimed in claim 22 wherein said predetermined image is a line approximately one inch in length.

24. A means as claimed in claim 21 wherein the predetermined movement of the pen which is detected is a downstroke.

25. A means as claimed in claim 21 wherein said means is operative only if said pen is not writing.

26. A means as claimed in claim 25 wrhein the duration of said timer is five to twenty seconds.

27. A means as claimed in claim 25 including a second timer, the duration of said second timer being greater than the duration of the timer; and
wherein said means responsive to said timer timing out is operative for the timing out of said second timer only if said pen is writing.

28. A means as claimed in claim 27 wherein the duration of said second timer is 1 to five minutes.

29. A means as claimed in claim 27 wherein said means determines if the writing is at a selected point, causes an upstroke of the pen, moves said pen to a predetermined address position, causes a downstroke of the pen, and writes a predetermined image.

* * * * *